UNITED STATES PATENT OFFICE.

HARRY JOHNSTON MITCHELL, OF WILMERDING, PENNSYLVANIA.

HORSE-DETACHING DEVICE.

1,015,699. Specification of Letters Patent. Patented Jan. 23, 1912.

Application filed February 7, 1910. Serial No. 542,416.

*To all whom it may concern:*

Be it known that I, HARRY JOHNSTON MITCHELL, citizen of the United States, residing at Wilmerding, in the county of Allegheny and State of Pennsylvania, have invented certain new and useful Improvements in Horse-Detaching Devices, of which the following is a specification.

This invention relates to improvements in devices for detaching excited horses from vehicles, to prevent injury to the occupants of the vehicle.

One of the objects of the invention is the provision of a simple horse detaching device with brake means for the vehicle after the horse is detached, thus preventing injury due to the momentum of the moving vehicle, which means is operated instantly with the release of the horse.

With the above and other objects in view the invention comprises certain combinations, constructions and arrangements of parts, clearly described in the following specification and clearly illustrated in the accompanying drawings, in which, Figure 1 is a top plan view, Fig. 2 is a detail view of a hold back strap device, Fig. 3 is a detail plan view of a trace hook, Fig. 4 is a detail sectional view of the connection for said hook, Fig. 5 is a side elevation of a vehicle provided with the improved device, with the tongues shown in dotted lines in the position when the vehicle is braked as when a horse is manually released, Fig. 6 is a detail sectional view of a clutch band wheel, and Fig. 7 is a detail perspective view of a connection for the clutch band used in braking the vehicle.

Referring to the accompanying drawings illustrating the invention 1 denotes a front axle on the ends of which wheels 2 are journaled, and 3 the box of a vehicle. The shafts 4 are pivotally connected at 5 to the attachments 6, which are secured to the axle 1. A band clutch wheel 7 is mounted on one of the wheels 2, around which a clutch band 8 is passed. The band 8 is connected at one end to an angular arm 9 secured around one of the shafts while the other end of said band is secured to a forwardly extending arm 10 by means of a connection 11, which comprises an angular lower arm and a bifurcated attaching portion 12, adapted to be clamped on the arm 10. When the shafts are dropped, as shown in dotted lines in Fig. 5, the band 8 will be tightened around the wheel 7, thus arresting or retarding the movement of the wheels.

On the cross bar 13' of the shafts 4 is mounted the whiffletree, upon the ends of which two trace hooks are located. Each of these trace hooks comprises a bearing member 14 which is formed with outwardly projecting arms 15 and 16, the arm 16 being slightly shorter than the arm 15. On the arm 15 a trace holding arm or hook member 17 is pivotally secured by a screw 18, and a strap member 19 having a slot 19' (shown in dotted lines) therein is pivotally secured by a screw 20 to the arm 16, so as to engage the hook member 17 and hold a trace on the whiffletree 13.

20' is a spring for normally holding the member 19 in locking engagement with the member 17.

The bearing members 14 are connected to the whiffletree 13 by means of two plates 21. The pivot release members or straps 19 are connected to operating cords 22 which are in turn suitably connected to the vehicle. By pulling on the operating cords 22 the members 19 are swung out of engagement with hook members 17, so that the pull of the horse upon the hooks will swing said hooks on the supporting or bearing member 14, thereby releasing the trace straps. On the undersides of the shafts 4 two hold back strap devices are secured. These devices consist of U-shaped members 23, which are each provided with small springs 24, adapted to prevent the withdrawal of the hold back straps under normal conditions but to allow said withdrawal when the trace straps are released.

Having described my invention I claim:—
In combination, a vehicle having wheels, A. MOSSO & P. GIOVANETTI.
VEHICLE WHEEL.
APPLICATION FILED JUNE 26, 1911.
1,015,700.
Patented Jan. 23, 1912.
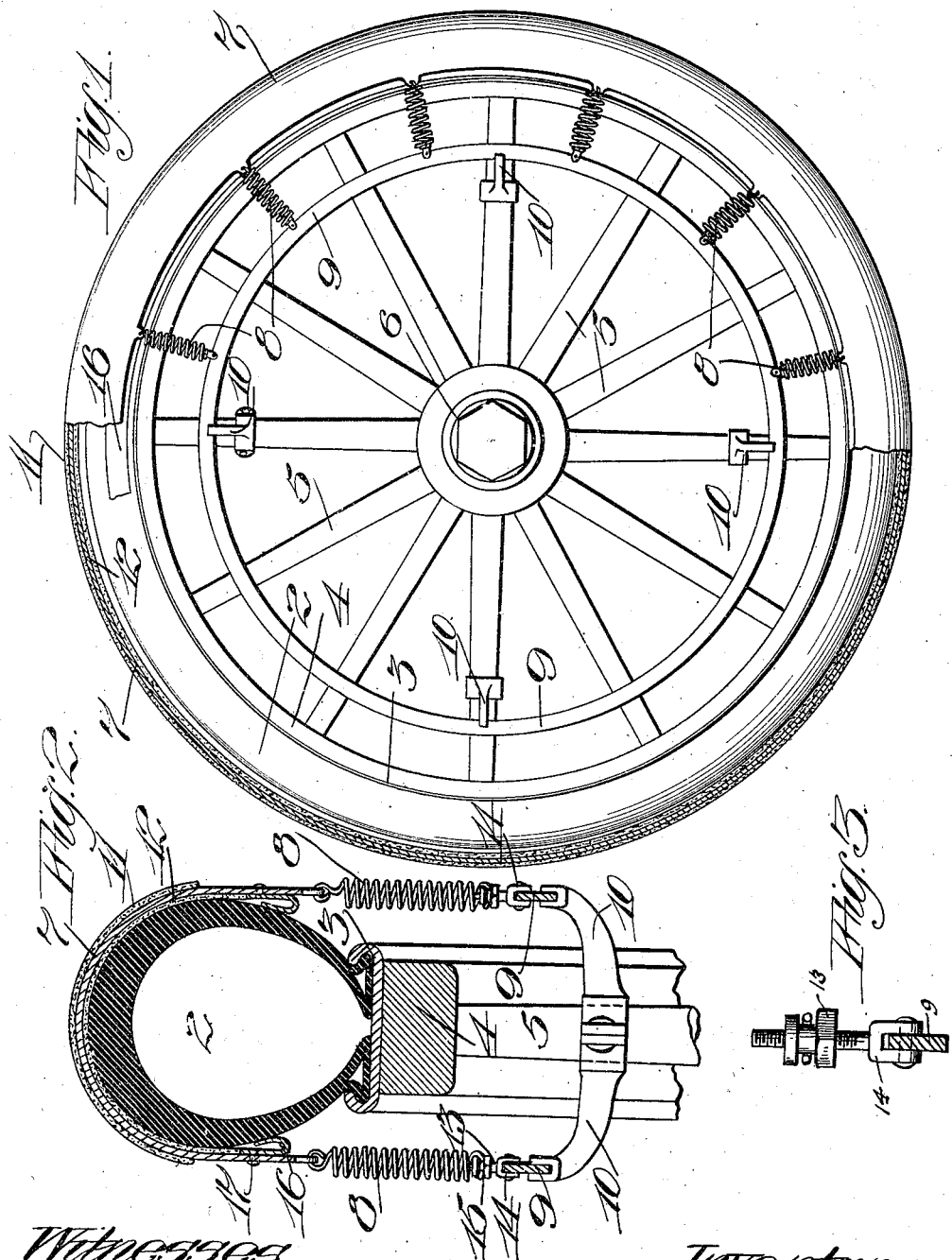

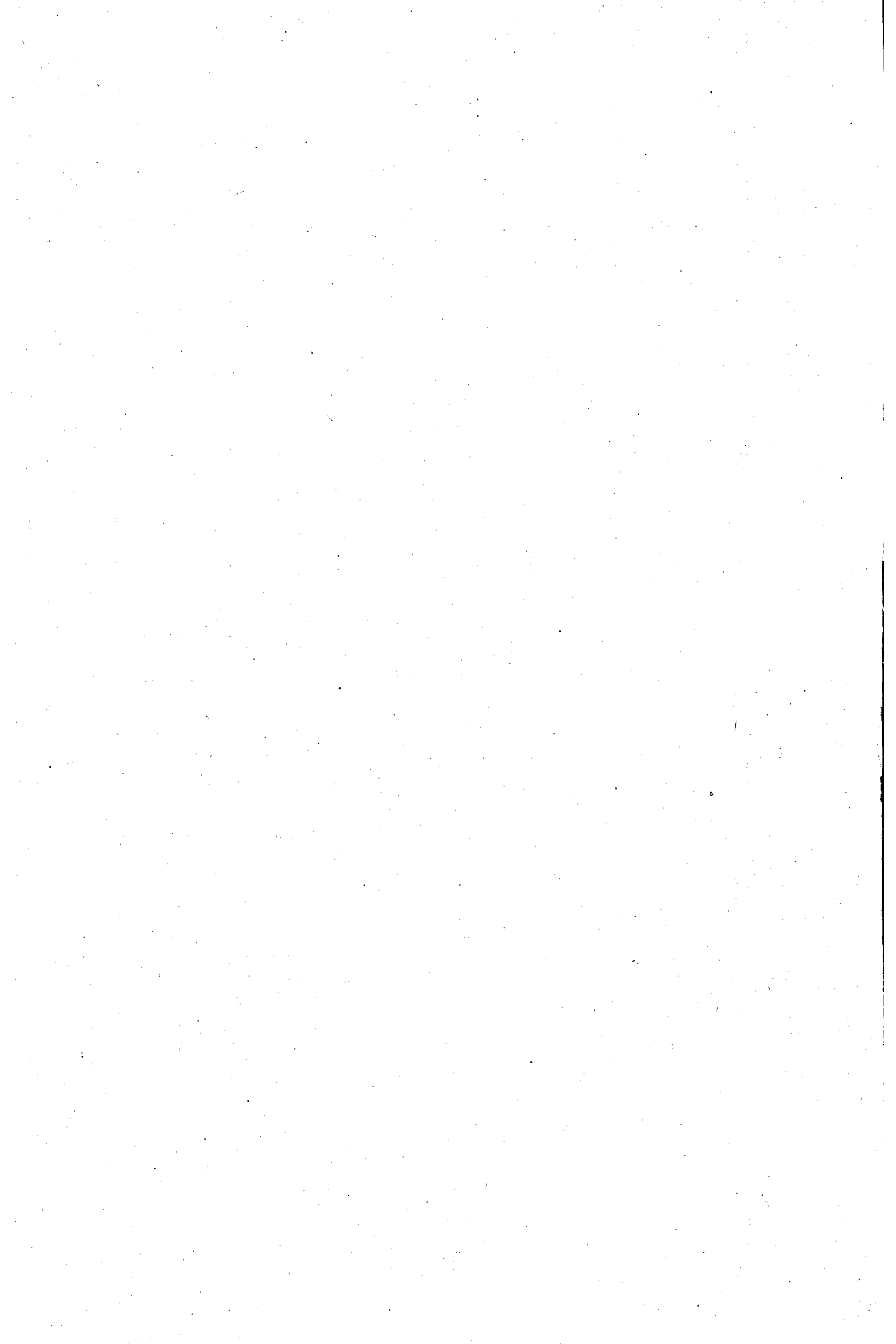

UNITED STATES PATENT OFFICE.

ARTHUR MOSSO, OF SONOMA, AND PIETRO GIOVANETTI, OF SAN FRANCISCO, CALIFORNIA.

VEHICLE-WHEEL.

1,015,700.　　　　Specification of Letters Patent.　　Patented Jan. 23, 1912.

Application filed June 26, 1911. Serial No. 635,350.

*To all whom it may concern:*

Be it known that we, ARTHUR MOSSO, residing at Sonoma, Sonoma county, California, and PIETRO GIOVANETTI, residing in the city and county of San Francisco, California, both subjects of the King of Italy, have invented new and useful Improvements in Vehicle-Wheels, of which the following is a specification.

This invention relates to vehicle wheels.

The object of the present invention is to provide a wheel for vehicles so constructed as to be soft and easy riding, and which may be provided with pneumatic cushioning members or equivalent devices for the purpose of supporting the hub of the wheel in a resilient fashion upon the roadway; also to provide means for protecting the pneumatic cushion against puncture and to protect its surface against wear and abrasion by contacting with the roadway; and particularly to provide an improved armoring rim or tread portion adapted to bear upon the roadway and to protect the cushion device of the wheel from injury and contact with the same.

Other objects will be made manifest in the following specification.

The invention consists of the parts and the construction and combination of parts, as hereinafter more fully described and claimed, having reference to the accompanying drawings, in which—

Figure 1 is a side elevation of the improved wheel. Fig. 2 is a transverse section through a portion of the wheel. Fig. 3 is a detail showing means for adjusting the armor restraining springs.

It is the desideratum to provide a wheel in which may be embodied a pneumatic cushion 2 which may be attached in appropriate manner, as by clencher rings 3, attached to the wheel felly 4, which is provided with spokes 5 and a hub 6.

Ordinarily the pneumatic supporting device 2 runs in contact with the roadway and is not only subjected to great wear and strains, but is frequently punctured and thereby causes considerable annoyance and expense in maintenance.

The present invention comprehends the provision of a bearing tread or armor in the form of a continuous concaved ring or plate 7, which may be of metal or other appropriate material of such diameter as to surround the pneumatic cushion 2 of the wheel and normally be sustained free of the periphery of the pneumatic cushion 2 if the hub of the wheel be lifted so that the load is taken from the cushion 2.

The armor rim or tread member 7 has a concavo-convex cross section approximating the periphery of the cushion 2, and is sustained free of the cushion by means of suitable contractile links or appropriate connections, here represented as springs 8 which are connected at suitable intervals to the opposite edges of the armor rings 7. They are also connected at their inner ends to freely circumferentially movable hanging rings 9, which are supported concentric with relation to the center of the wheel by bearing yokes 10 which are attached to the spokes 5 of the wheel.

The diameter of the hanger ring 9 is such as to permit the suspending resilient links 8 to be of sufficient length to provide a very substantial and yet pliable connection between the armor rim 7 and the hanger ring 9. The ring 9 is supported in its bearings 10 freely so that it may move circumferentially about the wheel, as there is a tendency or inclination on the part of the main portion of the wheel to move circumferentially independently of the tread rim 7.

The armoring tread member 7 may be provided on its exterior bearing surface with a suitable material, such as fiber, rubber or other substance, indicated at 11, which substantially covers the entire outer surface of the armor member 7, and the inner surface of the latter may be coated with a suitable material which may be a composition, fabric, rubber, etc., indicated at 12.

In constructing the wheel, or in applying the armored member to wheels already in use, the bearing members 10 are adjusted in position upon the spokes 5 of the wheel, and moved downwardly so as to embrace the circumferentially movable rings 9 and maintain them in a position concentric to the center of the wheel. The cushion member 2 may be deflated and the armor rim 7 adjusted on the exterior surface of the deflated cushion 2, so that when the latter is expanded, it will partly fill the concavity within the inner surface of the armor rim 7. The rim is then connected to the adjusted hanger rings 9 by the several con-